Figure 1:
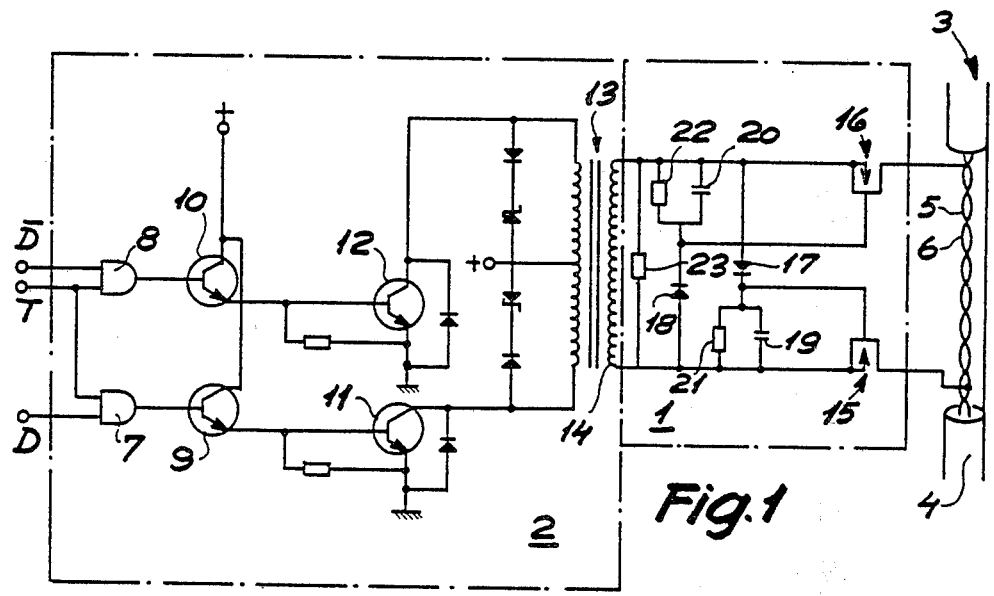

United States Patent [19]

Smitt

[11] 4,445,222

[45] Apr. 24, 1984

[54] COUPLING CIRCUIT FOR TRANSFERRING DATA SIGNALS AT A HIGH RATE

[75] Inventor: Asbjorn Smitt, Vedbaek, Denmark

[73] Assignee: Christian Rovsing A/S, Ballerup, Denmark

[21] Appl. No.: 194,451

[22] PCT Filed: Oct. 26, 1979

[86] PCT No.: PCT/DK79/00043

§ 371 Date: Jun. 30, 1980

§ 102(e) Date: Jun. 25, 1980

[87] PCT Pub. No.: WO80/01008

PCT Pub. Date: May 15, 1980

[30] Foreign Application Priority Data

Oct. 30, 1978 [DK] Denmark .................. 4838/78

[51] Int. Cl.³ ............................................ H04L 5/16
[52] U.S. Cl. ................................. 375/36; 370/85; 307/270
[58] Field of Search ............... 375/36, 7, 8, 9, 4; 370/42, 85, 15; 333/24 R, 25, 100, 101, 103–105, 124, 131; 455/79; 178/63 R, 63 B; 307/446, 448, 260, 270, 164; 179/16 F, 170 R

[56] References Cited

U.S. PATENT DOCUMENTS

| | | | |
|---|---|---|---|
| 3,465,101 | 4/1966 | Christian et al. | 375/36 |
| 3,760,198 | 9/1973 | Mori et al. | 328/164 |
| 3,812,292 | 5/1974 | Tink et al. | 375/36 |
| 3,832,575 | 8/1974 | Dasgupta et al. | 307/270 |
| 3,912,948 | 10/1975 | Bapat | 307/448 |
| 3,986,046 | 10/1976 | Wunner | 307/446 |
| 4,004,102 | 1/1977 | Ott | 179/16 F |
| 4,024,501 | 5/1977 | Herring et al. | 370/85 |
| 4,029,971 | 6/1977 | Pryor | 307/270 |
| 4,078,159 | 3/1978 | Lender et al. | 375/4 |
| 4,090,035 | 5/1978 | Popkin | 370/15 |
| 4,109,117 | 8/1978 | Wrench, Jr. et al. | 375/36 |
| 4,149,030 | 4/1979 | Foreman | 375/85 |
| 4,254,501 | 3/1981 | Griffith et al. | 375/36 |
| 4,283,695 | 8/1981 | Scandurra | 333/101 |

FOREIGN PATENT DOCUMENTS

| | | |
|---|---|---|
| 2101211 | 8/1971 | Fed. Rep. of Germany . |
| 2702209 | 7/1978 | Fed. Rep. of Germany . |
| 1590158 | 5/1970 | France . |
| 2443770 | 12/1978 | France .................. 375/36 |

Primary Examiner—Robert L. Griffin
Assistant Examiner—Stephen Chin
Attorney, Agent, or Firm—Fleit, Jacobson, Cohn & Price

[57] ABSTRACT

A coupling circuit for transferring data from a data transmitter to a bus common to several transmitters, each data transmitter being galvanically separated from the bus. The coupling circuit has a signal separator and a switch connected in series between its input and an output connected to the bus. The switch is controlled solely by the data signals transferred from the data transmitter via the signal separator and a rectifier circuit.

8 Claims, 2 Drawing Figures

COUPLING CIRCUIT FOR TRANSFERRING DATA SIGNALS AT A HIGH RATE

The invention relates to a coupling circuit for transferring data signals at a high rate from a data transmitter to a bus common to several data transmitters. The invention concerns in particular coupling circuits for data transmitters that may be placed far from each other, which entails that there may be huge differences in potential between the individual data transmitters, and it is therefore required that the data transmitters are galvanically separated from the long bus by separator means and that the data signal is transmitted on the bus in the form of a differential signal. More particularly, the invention relates to a coupling circuit for transferring data at a high rate from a data transmitter to a bus common to several data transmitters, said circuit comprising separator means for galvanically separating each data transmitter from the bus and for producing an output signal on a signal output via switch means positioned between the signal output and the separator means.

When a single one out of many data transmitters connected to the same bus is to transmit data signals, the nontransmitting units must not load the bus noticeably, and it is therefore necessary that beside having two logic transmission states where the associated generator impedance is low, each transmitter has also a third state, called "high impedance state", where the transmitter has a high output impedance when it does not transmit data signals.

The separator means may be a transformer whose secondary windings constitute the terminals of the data output, or may be provided by means of capacitors, optical couplings, etc. The German Offenlegungsschrift No. 2 702 209 shows an example of optical separator means. They suffer from the drawback that they cannot transfer power and that the bus must be active, e.g. carry supply current to the phototransistors.

A transformer is preferred for most uses because, normally, higher signal amplitude is desired on the bus than the output voltage of most logic circuits, but for uses where no increase in amplitude is required the separator means will be cheaper in the form of a pair of capacitors. Below the invention will mainly be described in connection with a transformer as separator means.

Coupling circuits are known where one winding of the transformer is directly connected to the bus, while the other winding of the transformer is connected to a driver which for providing the high impedance state exhibits high output impedance when no data signals are transmitted. This technique, however, can only be employed in connection with high rate data signals if only few circuits of this type are connected to the common bus. The high output impedance in the high impedance state of the transmission circuit should of course be converted into a correspondingly high output impedance by the transformer, but owing to the high transmission frequency the iron core of the transformer will result in a heavy load on the bus. For many uses, such as for multiplex systems where the units alternately transmit many brief data blocks, it is desired that the coupling circuit have a change-over time which is significantly shorter than the change-over time for relays, and consequently a relay technique cannot be used for the purpose.

The object of the invention is to provide a rapidly reacting coupling circuit that can transfer data signals from a data transmitter to a bus common to many transmitters and which brings about an effective high impedance state, i.e. that many coupling circuits of the invention may be connected to a common bus without loading the bus noticeably when data signals are not transmitted.

This object is achieved in that the coupling circuit comprises a switch which is connected in series between each signal output and a separator means and is arranged to be actuated and driven solely by the data signal applied from the data transmitter through the separator means. Thus the circuit is interrupted at such a location that the iron core of the transformer or any other load via a separator capacitor does not involve the drawback mentioned above. The switches are actuated only by the data signal applied from the data transmitter through the separator means, and therefore the desired, galvanic separation is maintained which could not be achieved e.g. by inserting drive transistors at the location of the switches without separate means for supplying the drive transistors with direct current. Thus, it is a characteristic feature of the coupling circuit of the invention that it is capable of showing an effective high impedance state irrespective of the output impedance of the data transmitter and that it shall not be connected to a current supply.

Said switch is preferably a transistor device whose control electrode is connected to a rectifier circuit coupled to the output of the separator means, where the control electrode does not result in any noticeable load.

The use of a field effect transistor simplifies considerably the transistor device because a field effect transistor is bipolar and thus particularly expedient in connection with the differential operation where current flows in both directions.

Owing to the transmission effect such transistors are selected as show high resistance in the disconnected state and are capable of carrying a heavy current in the open state, which is the case e.g. of the so-called V-MOS field effect transistors.

If a semi-conductor, which does not exhibit infinitely large resistance in the disconnected state, is used as a switch a transmitter will produce a voltage across the rectified circuit of another transmitter for the transistor device if the separator means have a high output impedance in a non-transmitting state. Said voltage will reduce the series resistance of the transistor device, resulting in an even higher voltage across the rectifier circuit so that the first-mentioned, transmitting unit will drive the coupling circuit of another unit in an open state. This is avoided by connecting a resistive load in parallel across each rectifier circuit when the resistance of the resistive load is selected to be suitably lower than the resistance of the transistor devices in their disconnected state.

The coupling circuit of the invention thus permits the simultaneous achievement of a short change-over period, a relatively high transmission effect and a high impedance state irrespective of the construction of the data transmitter and the separator means. The coupling circuit is accordingly a well-defined, generally useful circuit with few components that require no current supply. The coupling circuit is accordingly particularly useful for being integrated on a single semi-conductor substrate.

Figure 2:
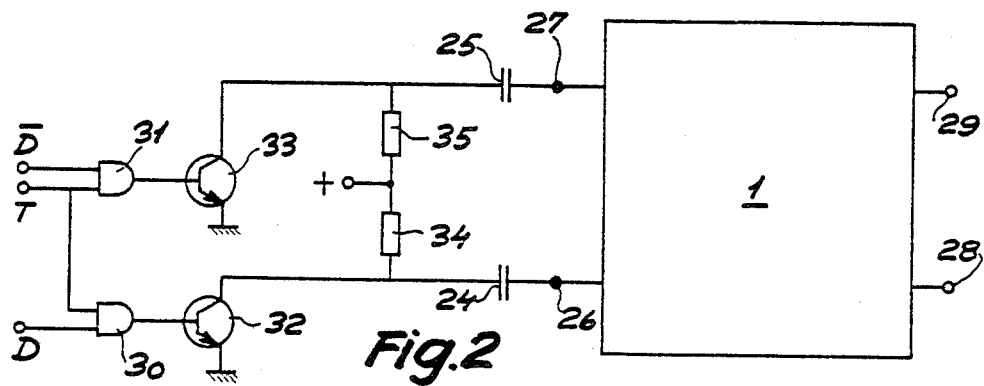

The invention will be explained in greater detail in the following description of an embodiment with reference to the drawing, in which FIG. 1 shows an embodiment of the coupling circuit of the invention, with a circuit switch connected between a bus and a transmission driver with a transformer as separator means, and FIG. 2 shows another transmission driver with capacitors as separator means.

In FIG. 1 there is shown an embodiment of the coupling circuit of the invention with a switch-circuit 1, located between a driver 2 known per se and a bus 3 consisting of a screen 4 and two twisted inner conductors 5 and 6 which are connected to their respective output terminals of the circuit 1.

Before the description of the coupling circuit itself, the manner in which the driver 2 operates will first be described, particularly in relation to the so-called high impedance state which means that the output impedance of the driver 2 may be high depending upon a control signal T on the input of the driver. The driver 2 has two other inputs D and $\overline{D}$, respectively, to which the data signals (and the conjugated signals) are applied which are to be transmitted on the bus 3. If the state of the input terminal T is logic one it will be appreciated that the data signals D and $\overline{D}$ are transmitted directly through the AND gates 7 and 8, respectively, to alternately drive the transistors 9, 11 and 10, 12, respectively, in conductive and disconnected state, respectively, so that alternately current flows through the two primary windings of the transformer 13. The unspecified diodes in the figure serve, in a manner known per se, to protect the transistors 11, 12, while the unspecified resistors serve to properly bias the circuit in a manner known per se. If the state of the input terminal T is changed to logic zero no data will be passed through the AND gates 7 and 8 so that the transistors are not conductive. Therefore the driver 2 consumes only little current when no data are transmitted, and in this state the output impedance of the driver 2, seen into the secondary winding 14 of the transformer 13, is high.

According to the invention the circuit 1 is designed to provide an interruption between the bus 3 and the transformer 13 in such a manner that this interruption may be controlled very quickly and in a galvanically separated manner relative to the driver 2. In the shown embodiment the interruption is effected by means of two field effect transistors 15, 16 whose drain electrodes are connected to the respective conductors 5 and 6, respectively, and whose source electrodes are connected to the respective ends of the winding 14. The control electrode of the transistor 15 is connected to a rectifier circuit comprising a diode 17 and a capacitor 19, while the control electrode of the transistor 16 is connected to a corresponding rectifier circuit comprising a diode 18 and a capacitor 20. When the driver 2 transmits data signals via the transformer 13 a control voltage will be produced in the junctions between the diode 17 and the capacitor 19 and between the diode 18 and capacitor 20, respectively. The control voltage drives the field effect transistors 15, 16 in a conductive state where independently of the polarity they show a resistance of a few ohms so that the data signals are transmitted directly to the bus 3. When the driver 2 does not transmit data signals no control voltage will be produced for the transistors 15 and 16 which are therefore in disconnected state where there is such a high resistance that the circuit 1 involves no noticeable load on the bus 3.

The coupling circuit of the invention is particularly characteristic in that besides having the properties already mentioned it can change very quickly between the open (small resistance) and the closed (large resistance) state. If the data rate is e.g. of a magnitude of $10^6$ bit per sec., it will only take a few bits for the transistors 15 and 16 to open. In practice, this may be done by providing a brief bit pattern to precede the data block it is desired to transmit to the bus 3 via the circuit 1, said bit pattern resulting in a sufficient number of changes in polarity depending upon the data representation so that the coupling circuit is in the fully open state when the flag of the data block is to be transmitted. On termination of the data transmission the coupling circuit changes quickly to the closed state depending upon the time constant selected for the capacitor 19 and a resistor 21 and the capacitor 20 and a resistor 22, respectively. The time constant is selected so that the coupling circuit may be kept open sufficiently long depending upon the polarity change of the selected data representation.

As the impedance, seen into the winding 14 of the transformer 13, is sufficiently high, as explained in the foregoing, when no data are transmitted, it will be appreciated that a data signal which is transmitted on the bus 3 by another unit with the circuit 1 in the closed state, will be able to produce a voltage across the winding 14 because the resistance of the transistors 15 and 16 is not infinitely high in the closed state. This involves the risk of the voltage across the winding becoming so high that the transistors 15 and 16 open which results in an additional increase in the voltage across the winding 14 so that eventually a transmitting unit will drive the other coupling circuits connected to the bus 3 to the open state, which in turn will apply a detrimental load to the transmitting unit. This phenomenon is obviated by a resistor 23 which is mounted across the winding 13 and whose resistance is so determined with respect to the resistance of the transistors 15, 16 in their disconnected states that the control voltage cannot exceed a predetermined value.

In the shown embodiment the control voltages for the transistors 15 and 16 are provided by rectifier circuits which are directly connected across the winding 14 of the transformer 13. It will be appreciated that a lower or higher control voltage may be provided by means of a special tap on the winding 14 or by means of separate windings. The construction of the coupling circuit shown in the figure has the advantage that it has only two input terminals that can be connected directly to the winding 14 so that the coupling circuit of the invention is particularly suitable for being manufactured as an integrated circuit which is not to be connected to the current supply, but has merely two input terminals and two output terminals for coupling between the transformer and the bus.

The general use of the circuit appears also from the fact that it carries no importance what separator means are used in connection with the data transmitter. The circuit shown in FIG. 2 will serve as an example of a data transmitter with separator capacitors and will be briefly explained.

FIG. 2 shows a data transmitter with separator means in the form of two capacitors 24 and 25, which are connected to their respective input terminals 26 and 27, respectively, of the circuit 1 which is shown in FIG. 1 and whose output terminals 28 and 29 can be connected to the bus 3 shown in FIG. 1. Like the data transmitter shown in FIG. 1 the data transmitter has two AND gates 30, 31 with inputs for a control signal T and for data signals D and $\overline{D}$. When data are transmitted the transistors 32 and 33 will alternately be conductive and apply data signals to the circuit 1. This will be appreciated e.g. by assuming that the transistor 32 changes from a disconnected to a conductive state which means that a direct current is drawn through the resistor 34 and also a current pulse through the resistor 35, through the capacitor 25, the circuit 1 and the capacitor 24. These current pulses drive the transistor devices in the circuit 1 to the open state, transferring the data signals to the bus. When the control signal T is logic zero, no data signals are transferred and the output impedance of the data transmitter, seen from the terminals 26 and 27, will be substantially equal to the parallel resistance of the resistors 34 and 35 at the signal transmission frequency. As, however, no data are transmitted the transistor devices will be disconnected so that the output impedance on the terminals 28 and 29 is high, as is desired, irrespective of the resistance of the resistors 34 and 35. The data transmitter shown in FIG. 2 has the drawback that power is lost in the resistors 34 and 35 when data are transmitted, and the resistors 34 and 35 may therefore advantageously be replaced by transistor elements, but on the other hand the example shows that the coupling circuit of the invention also operates in cases where the data transmitter is very simple and does not per se exhibit a high impedance state.

I claim:

1. A coupling circuit having a signal output for transferring a data signal at a high rate from a data transmitter to a bus common to several data transmitters, said circuit comprising separator means for galvanically separating said data transmitter from the bus and for providing said data signal via the signal output as an output signal, and switch means connected in series between the separator means and said signal output, and actuated and driven solely by the data signal from the data transmitter through the separator means, wherein said switch means comprises at least one switching transistor responsive to provision of said data signal by said data transmitter via said separator means for transferring said data signal via said signal output to said bus, and responsive to non-provision of said data signal by said data transmitter via said separator means for presenting a high impedance to said bus, said switch means further including a control circuit driven by said data signal via said separator means for controlling said at least one switching transistor to assume an on or an off state, whereby said data transmitter does not present a load to said bus when not providing said data signal.

2. A coupling circuit according to claim 1, wherein said at least one switching transistor comprises two transistor devices which, with mutually opposite forward directions, are positioned in series between said separator means and said signal output, and which each have a control electrode, said switch means further comprising two rectifier circuits, one for each transistor device, each disposed in parallel across the separator means and each galvanically separated from the data transmitter.

3. A coupling circuit according to claim 2, wherein said signal output comprises a pair of signal output lines, and each transistor device comprises a field effect transistor having a source-drain electrode connected in series with a respective one of the signal output lines, and having a control electrode connected to a respective one of said rectifier circuits.

4. A coupling circuit according to claim 2, wherein the separator means exhibits a high impedance state in an operative state, said coupling circuit further comprising a resistive load disposed in parallel across each rectifier circuit for preventing detrimental loading of said data transmitter unit from said bus.

5. A coupling circuit according to any one of claims 1, 2, 3 or 4, wherein the coupling circuit is integrated on a single semi-conductor substrate.

6. A coupling circuit according to claim 1, wherein said separator means comprises a transformer.

7. A coupling circuit according to claim 1, wherein said separator means comprises at least one capacitor.

8. A coupling circuit according to claim 1, wherein said separator means has two output terminals, and said at least one switching transistor comprises a source electrode connected to one of said two output terminals and a control electrode connected via a rectififer to the other of said two output terminals.

* * * * *